Figure 1:
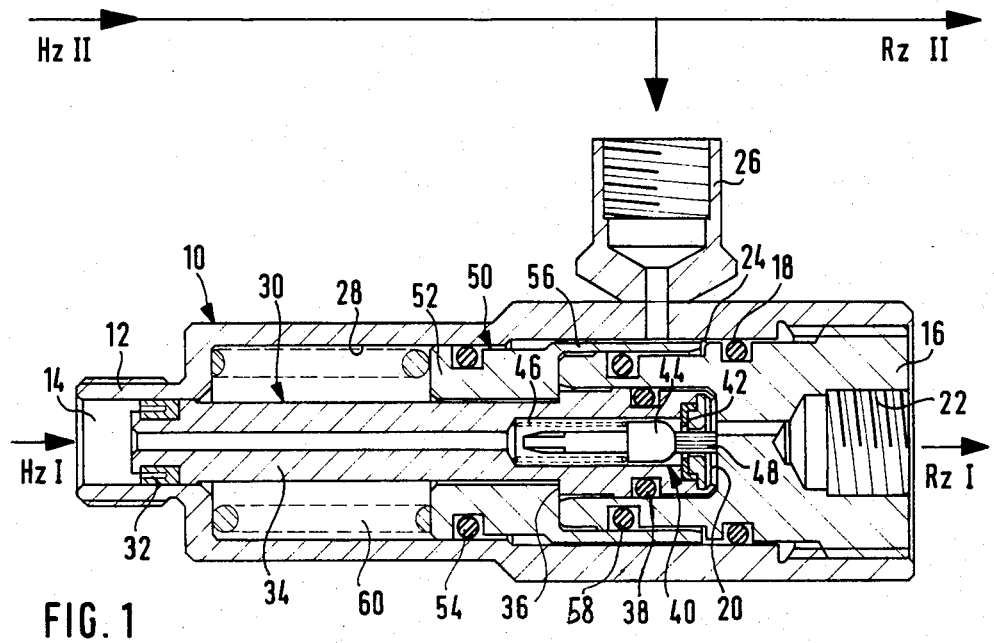

United States Patent [19]

Wloczyk

[11] Patent Number: 4,511,185

[45] Date of Patent: Apr. 16, 1985

[54] BRAKE PRESSURE REGULATOR FOR AN HYDRAULIC VEHICLE BRAKING SYSTEM

[75] Inventor: Uwe Wloczyk, Koblenz, Fed. Rep. of Germany

[73] Assignee: Lucas Industries Public Limited Company, Birmingham, England

[21] Appl. No.: 504,879

[22] Filed: Jun. 16, 1983

[30] Foreign Application Priority Data

Jun. 18, 1982 [DE] Fed. Rep. of Germany ....... 3222798

[51] Int. Cl.$^3$ .............................................. B60T 8/26
[52] U.S. Cl. .................................... 303/6 C; 188/349
[58] Field of Search ..................... 303/6 C, 6 R, 84 R, 303/84 P; 188/349

[56] References Cited

U.S. PATENT DOCUMENTS 3,669,505  6/1972  Falk .................................... 303/6 C

*Primary Examiner*—Bruce H. Stoner, Jr.
*Assistant Examiner*—Alvin Oberley
*Attorney, Agent, or Firm*—Scrivener Clarke Scrivener and Johnson

[57] ABSTRACT

A brake pressure regulator for an hydraulic vehicle braking system. A first inlet chamber (14) and an outlet chamber (20) for a first brake circuit (HzI-RzI) are defined by piston surfaces of different sizes of a stepped piston (30) which controls a valve (40) disposed in a connection between these two chambers (14, 20). The pressure in a second inlet chamber (24) adapted to be connected to a second brake circuit (HzII-RzII) acts on an annular control piston (50) which is acted upon in opposite direction by a spring (60). The control piston (50) surrounds the stepped piston (30) without contacting the same and is sealed radially inwardly against a plug (16) which is inserted in the housing (10) and which in turn surrounds the stepped piston (30) in sealing fashion. When as switching pressure in both brake circuits (HzI-RzI, HzII-RzII) is surpassed, the stepped piston (30), aided by the control piston (50), adopts a position at which the valve (40) closes. Subsequently, the stepped piston (30) sealed by only two sealings (32 and 38) reciprocates, against little frictional resistance, between positions in which alternatingly it opens and closes the valve (40), thereby causing a pressure rise in rear wheel brake cylinders (RzI) in circuit at a reduced ratio in comparison with the pressure rise in front wheel brake cylinders (RzII).

3 Claims, 2 Drawing Figures

BRAKE PRESSURE REGULATOR FOR AN HYDRAULIC VEHICLE BRAKING SYSTEM

The invention relates to a brake pressure regulator for an hydraulic vehicle braking system, comprising a housing in which a first inlet chamber and an outlet chamber for a first brake circuit and a second inlet chamber for connection to a second brake circuit are formed, the first inlet chamber and the outlet chamber are defined by piston surfaces of different sizes of a stepped piston, the stepped piston controls a valve in a connecting line between the first inlet chamber and the outlet chamber, spring force tends to hold the stepped piston in a position in which the valve leaves the connecting line open, the second inlet chamber is defined by an annular control piston loaded by spring force in the same direction as the stepped piston, against the pressure in the second inlet chamber, and the stepped piston, aided by the control piston, adopts a position at which the valve closes when a first switching pressure in both brake circuits is surpassed, the stepped piston adopts this position only at a second, higher switching pressure if not aided by the control piston in overcoming the spring force because of pressure failure in the second brake circuit.

A brake pressure regulator of this kind is known from German Pat. No. 1 655 294 which shows the stepped piston to be guided in a stepped bore of the housing. The first inlet chamber is disposed between a step of the stepped piston and a step of the stepped bore and defined by two seals. The outlet chamber is defined, on the one hand, by the large front end face of the stepped piston and, on the other hand, by a plug screwed into the housing. The annular control piston is guided on a portion of the stepped piston and sealed with respect to the same as well as the housing by radially inner and outer sealing rings, respectively. Two helical springs are disposed concentrically with respect to each other in a tubular extension of the housing, the inner one thereof pressing by way of a dish-shaped intermediate member against that end of the stepped piston which is remote from the outlet chamber. The outer spring, on the other hand, presses by way of an annular intermediate member on that end face of the control piston which is remote from the second inlet chamber and, furthermore, may be supported by its radially inner edge on a shoulder of the stepped piston. The valve consists of a valve seat formed in the stepped piston and a spring-loaded valve body guided in the stepped piston and having a shaft which extends axially through the valve seat and abuts against the screwed-in plug when the stepped piston is in its inoperative position, thereby keeping the valve open.

If the two brake circuits connected to this known brake pressure regulator are allright and, therefore, essentially the pressure rise upon braking is the same in both brake circuits, the control piston compresses the outer spring by pushing the annular intermediate member away from the shoulder of the stepped piston. Consequently, in moving away from the plug because of the simultaneous pressure rise in the first inlet chamber and in the outlet chamber, the stepped piston need not overcome more than the resistance of the inner spring in order to reach a position at which the valve disposed inside the stepped piston interrupts the connecting line between the first inlet chamber and the outlet chamber passing through the same. As the pressure continues to rise in the two inlet chambers, the pressure in the outlet chamber does not rise at the same rate but instead less steeply than in the inlet chambers because of reciprocating movements of the stepped piston. Upon failure of the brake circuit to which the second inlet chamber is connected, the control piston must overcome the resistance of both springs before pressure rise in the first inlet chamber can cause it to reach a position at which the valve will close. Thus switch-over to less abrupt pressure rise in the outlet chamber is not effected until the pressure in that outlet chamber has attained a higher level than before when the second brake circuit was unimpaired.

A brake pressure regulator of the kind described thus is suitable to avoid overbraking of one or more rear wheels if their wheel brake cylinder(s) belongs to a brake circuit which is supplied with brake fluid through the outlet chamber of the brake pressure regulator while, for instance, the first of the two inlet chambers is connected directly to the master cylinder and the second one to a front wheel brake circuit fed separately from the master cylinder. In case of failure of the front wheel brake circuit the delayed switch-over of the brake pressure regulator provides for higher pressure to build up in the rear wheel brake circuit so that additional brake power can be obtained which partly compensates the failure of the brake power of the second brake circuit. In any case—with the second brake circuit impaired or intact—it is desirable that upon movement to close the valve, the stepped piston can commence a movement of retraction into its initial position against the smallest resistance possible, and thus quickly, upon further rise of the pressure in the first inlet chamber. It is the aim of this measure to have also the pressure in the outlet chamber and consequently in the in-circuit rear wheel brake cylinders rise without delay, if possible, and at the envisaged reduced rate of increase.

With the known brake pressure regulator described above, this further pressure increase in the outlet chamber is rendered more difficult and delayed by virtue of the stepped piston having to overcome the resistance to motion established by three seals, namely the two seals by which the stepped piston itself is sealed with respect to the housing and the further seal by which it is sealed with respect to the control piston.

Therefore, it is an object of the invention to develop a brake pressure regulator of the kind described initially such that after having reached the closing position of the valve, the stepped piston can react more sensitively to pressure rises in the first inlet chamber than is the case with the known brake pressure regulator described.

This object is met, in accordance with the invention, in that the control piston surrounds the stepped piston without contacting the same and is sealed radially inwardly against a plug which is inserted in the housing and which in turn sealingly surrounds the stepped piston.

In this manner the stepped piston need be sealed with respect to the housing or plug by two seals only, while the control piston cannot contribute any frictional resistance against movements of the stepped piston in the direction of the position at which the valve is open.

In a preferred embodiment of the invention the control piston has a radially outer apron which is sealed with respect to the plug and a stop portion disposed between a step formed in the stepped piston and a spring surrounding a shaft of the stepped piston between the first inlet chamber and the outlet chamber and loading also the stepped piston by way of the stop portion of the control piston.

This embodiment has the additional advantage that one spring only is required for both pistons; in respect of this spring the control piston and the stepped piston are connected in series. With the known brake pressure regulator described, on the other hand, the two pistons each are pressurized by a spring of their own and thus connected in parallel in this respect.

The preferred embodiment described of the instant invention may be developed further in that the outer diameter of the apron is greater and the inner diameter thereof is smaller than the outer diameter of the stop portion at which the control piston is sealed with respect to the housing.

Figure 2:
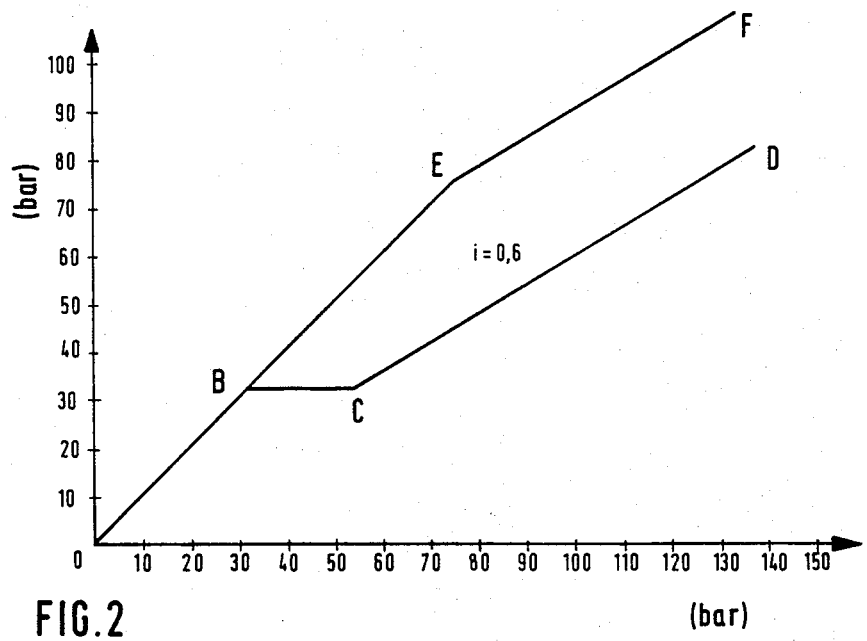

The invention will be described further, by way of example, with reference to the accompanying drawings, in which:

FIG. 1 is an axial sectional elevation of a brake pressure regulator according to the invention and FIG. 2 is a graph of the pressure rise in a rear wheel brake circuit, plotted above the pressure rise in a front wheel brake circuit.

The brake pressure regulator shown comprises a housing 10 made of sectional steel of square cross section. At the left end of the housing 10, as seen in FIG. 1, a first threaded stud 12 is formed so as to be screwed directly into a threaded bore of a master cylinder (not shown) thereby connecting a first pressure fluid chamber HzI of the master cylinder with a cylindrical first inlet chamber 14 formed inside the first threaded stud 12 of the brake pressure regulator. The other end of the housing 10, the right end as seen in FIG. 1, is closed by a plug 16 which is sealed by a sealing 18. The plug 16 comprises a cylindrical outlet chamber 20 which is open toward the left end of the plug, being the inner end with respect to the housing 10, and the axis of which is aligned with the axis of the housing 10. The outlet chamber 20 communicates with a threaded bore 22 machined from outside into the plug 16 and connected to wheel brake cylinders RzI of one or more rear wheels.

Behind the sealing 18, a second inlet chamber 24 is provided in the housing 10 which chamber essentially is formed by an annular space between the plug 16 and the wall of the housing 10. This second inlet chamber 24 communicates with a second threaded stud 26 connected to a connecting line between a second pressure fluid chamber HzII of the master cylinder and the wheel brake cylinders RzII of one or more front wheels. A cylindrical bore 28 is formed behind the second inlet chamber 24, to the left thereof as seen in FIG. 1, which chamber has a diameter somewhat smaller than the inner diameter of the housing 10 in the range of the second inlet chamber 24 but much larger than the diameter of the first inlet chamber 14.

A generally tubular stepped piston 30 is arranged inside the housing 10, the left end of the stepped piston 30 being guided in the cylindrical first inlet chamber 14 and sealed by a sealing 32. It is continued by a relatively slender shaft 34 which passes over by a step 36 into a right end of greater diameter guided in the cylindrical outlet chamber 20 and sealed by a sealing 38.

A valve 40 is disposed in the right end range of the stepped piston 30 having the larger outer diameter, which valve comprises a valve seat 42 fixed in the stepped piston 30 and a movable valve body 44 as well as a valve spring 46 attempting to press the valve body 44 against the valve seat 42. The valve body 44 is formed with a pin 48 projecting with clearance through the valve seat 42 and abutting against the plug 16 in the inoperative position shown of the brake pressure regulator. In this way the valve 40 is kept open.

An annular control piston 50 is arranged inside the second inlet chamber 24 and the cylindrical bore 28, which piston consists of a solid stop portion 52 guided in the cylindrical bore 28 in which it is sealed by a sealing 54 and surrounding the shaft 34 of the stepped piston 30 with radial clearance without being sealed with respect to this shaft. The control piston 50 further comprises a relatively thin, annular apron 56 projecting into the second inlet chamber 24 and having a cylindrical inner surface which is sealed with respect to the plug 16 by a sealing 58 embedded in the plug 16. The entire control piston 50 is pressurized at such pressure by a helical spring 60 arranged within the cylindrical bore 28 and around the shaft 34 that the control piston 50 is held in abutment not only against the inner end of the plug 16, being the left end in FIG. 1, but at the same time also against the step 36 of the stepped piston 30 when the brake pressure regulator is in its inoperative position illustrated.

Upon actuation of the master cylinder the pressure in the separated cylinder chambers thereof HzI and HzII rises as does the pressure in the wheel brake cylinders RzI and RzII. In FIG. 2 the pressure rise in the rear wheel brake cylinders RzI is entered on the ordinate and the pressure rise in the front wheel brake cylinders RzII on the abscissa. The initial pressure increase in both brake circuits HzI-RzI, on the one hand, and HzII-RzII, on the other hand, is at a ratio of 1:1 and thus characterized in FIG. 2 by a straight line O-B rising at an angle of 45°. At point B the pressure in the inlet chambers 14 and 24 and in the outlet chamber 20 has reached level p1 at which there is equilibrium between the sum of pressures acting toward the left on stepped piston 30 and control piston 50, on the one hand, and the bias of spring 60, on the other hand. The two pistons thus are at an instable equilibrium so that any small further pressure increase will cause both pistons to move to the left together, valve 40 closing.

At first any further pressure increase thus will not be transmitted from the first inlet chamber 14 to the outlet chamber 20 where the pressure consequently will remain constant for a while, as indicated by the horizontal straight line B-C in FIG. 2. At point C the pressure in the first inlet chamber 14 is so much higher than the pressure in the outlet chamber 20 that the stepped piston is displaced to the right, thereby preliminarily opening valve 40 again. The control piston 50 now withstands the pressure of spring 60 without being bolstered up by the stepped piston 30 since the pressure in the second inlet chamber 24 has increased as well. Valve 40 closes again as soon as equilibrium of the forces induced by the fluid pressures is established once more at the stepped piston 30 so that the tension of valve spring 46 will be sufficient to displace the stepped piston 30 to the left. The motions described of the stepped piston 30 are repeated at short cycles, as the pressure continues to rise, so that the pressure in the outlet chamber 20 will continue to increase in accordance with straight line C-D in FIG. 2 at a ratio of i=0.6 with respect to the pressure increase in the two inlet chambers 14 and 24. All the while the space for movement of the stepped piston 30 is kept free by control piston 50 because the latter is displaced steadily to the left by the pressure still rising in the second inlet chamber 24.

However, if the second brake circuit HzII-RzII fails and the pressure in the second inlet chamber 24 consequently drops to the pressure of the surroundings, the control piston 50 cannot aid the stepped piston 30 in compressing spring 60. The differential force directed to the left and acting on stepped piston 30 at the pressure p1 is not sufficient alone to displace the control piston 50 to the left against the resistance offered by spring 60. Such displacement is effected only when the pressure in the first inlet chamber 14 and in the outlet chamber 20 has reached the value p2. Thus the pressure in outlet chamber 20 increases beyond point B up to point E at a ratio of 1:1 with respect to the pressure in the first inlet chamber 14. It is only at this pressure p2 that the stepped piston 30 is displaced so far to the left that valve 40 begins to close. Upon further pressure increase in the first inlet chamber 14, the pressure in the outlet chamber 20 will rise only at the ratio of i=0.6 with respect to the pressure in the first inlet chamber 14, as indicated by the straight line E-F in FIG. 2.

What is claimed is:

1. A brake pressure regulator for an hydraulic vehicle braking system, comprising a housing (10)
    a first inlet chamber (14) and an outlet chamber (20) in fluid connection with each other in said housing and being connectable into a first brake circuit (HzI-RzI), and a second inlet chamber (24) in said housing for connection to a second brake circuit (HzII-RzII),
    the first inlet chamber (14) and the outlet chamber (20) being defined by piston surfaces of different sizes of a stepped piston (30),
    the stepped piston (30) controlling a valve (40) in said fluid connection between the first inlet chamber (14) and the outlet chamber (20),
    said stepped piston (30) being acted on by the biassing force of spring means urging said stepped piston towards a first position in which the valve (40) leaves said fluid connection open,
    the second inlet chamber (24) being defined by an annular control piston (50) having a cylindrical inner surface and being acted on by the biassing force of spring means in the same direction as the stepped piston (30) against the pressure in the second inlet chamber (24),
    said stepped piston (30) being aided by the control piston (50) to overcome the biassing force acting on said stepped piston to move it to a second position at which the valve (40) closes when a first switching pressure (p1) in both brake circuits (HzI-RzI, HzII-RzII) is surpassed,
    the stepped piston (30) being movable to said second position only at a second, higher switching pressure (p2) if because of pressure failure in the second brake circuit (HzII-RzII), said stepped piston is not aided by the control piston in overcoming the biassing force acting on said stepped piston, characterized in that said cylindrical inner surface of
    the control piston (50) surrounds the stepped piston (30) without contacting the same and said surface is sealed radially inwardly against a plug (16) which is inserted in the housing (10) and which in turn sealingly surrounds said stepped piston (30).

2. The brake pressure regulator as claimed in claim 1, characterized in that the control piston (50) includes a radially outer apron (56) which is sealed with respect to the plug (16), and a stop portion (52) disposed ahead of the plug (16) between a step (36) formed in the stepped piston (30), said spring means acting on said stepped piston and said control piston and comprising a spring (60) surrounding a shaft (34) of the stepped piston (30) between the first inlet chamber (14) and the outlet chamber (20) and loading the stepped piston (30) by way of the stop portion (52) of the control piston (50).

3. The brake pressure regulator as claimed in claim 2, characterized in that the outer diameter of the apron (56) is greater and the inner diameter thereof is smaller than the outer diameter of the stop portion (52) at which the control piston (50) is sealed with respect to the housing (10).

* * * * *